United States Patent [19]
Bredt

[11] 3,889,972
[45] June 17, 1975

[54] LANDING GEAR FOR SEMI-TRAILER

[76] Inventor: Elmer S. Bredt, 1722 E. Mayamensing Ave., Philadelphia, Pa. 19148

[22] Filed: Apr. 16, 1973

[21] Appl. No.: 351,964

[52] U.S. Cl. ................ 280/150.5; 212/145; 254/94
[51] Int. Cl. .............................................. B60s 9/04
[58] Field of Search.................... 280/150.5; 254/94; 212/145

[56] References Cited
UNITED STATES PATENTS
3,083,987   4/1963   Woolslayer ...................... 254/94 X

FOREIGN PATENTS OR APPLICATIONS
277,086   9/1927   United Kingdom................... 254/94
484,521   5/1938   United Kingdom................... 254/94
739,178   1/1933   France ................................. 254/94
903,450   10/1945  France ................................. 254/94

*Primary Examiner*—David Schonberg
*Assistant Examiner*—Michael J. Forman
*Attorney, Agent, or Firm*—Weiser, Stapler & Spivak

[57] ABSTRACT

A landing gear for semi-trailers comprising a generally pie-shaped landing pad, including an upper bearing of suitable size to readily pivotally affix to the existing landing gear axle. The landing pad includes a forward rise portion which terminates in a curved cam surface which acts as a cam when the trailer is either moved forwardly or rearwardly by a tractor. The arcuate portion terminates rearwardly in a flat, weight sustaining, support section of sufficient length to provide a stable surface to carry the weight of the semi-trailer. A spring biases between portions of the semi-trailer and the landing pad in a manner to continuously urge the landing pad rotatively about the axle to a position clear of the ground.

9 Claims, 7 Drawing Figures

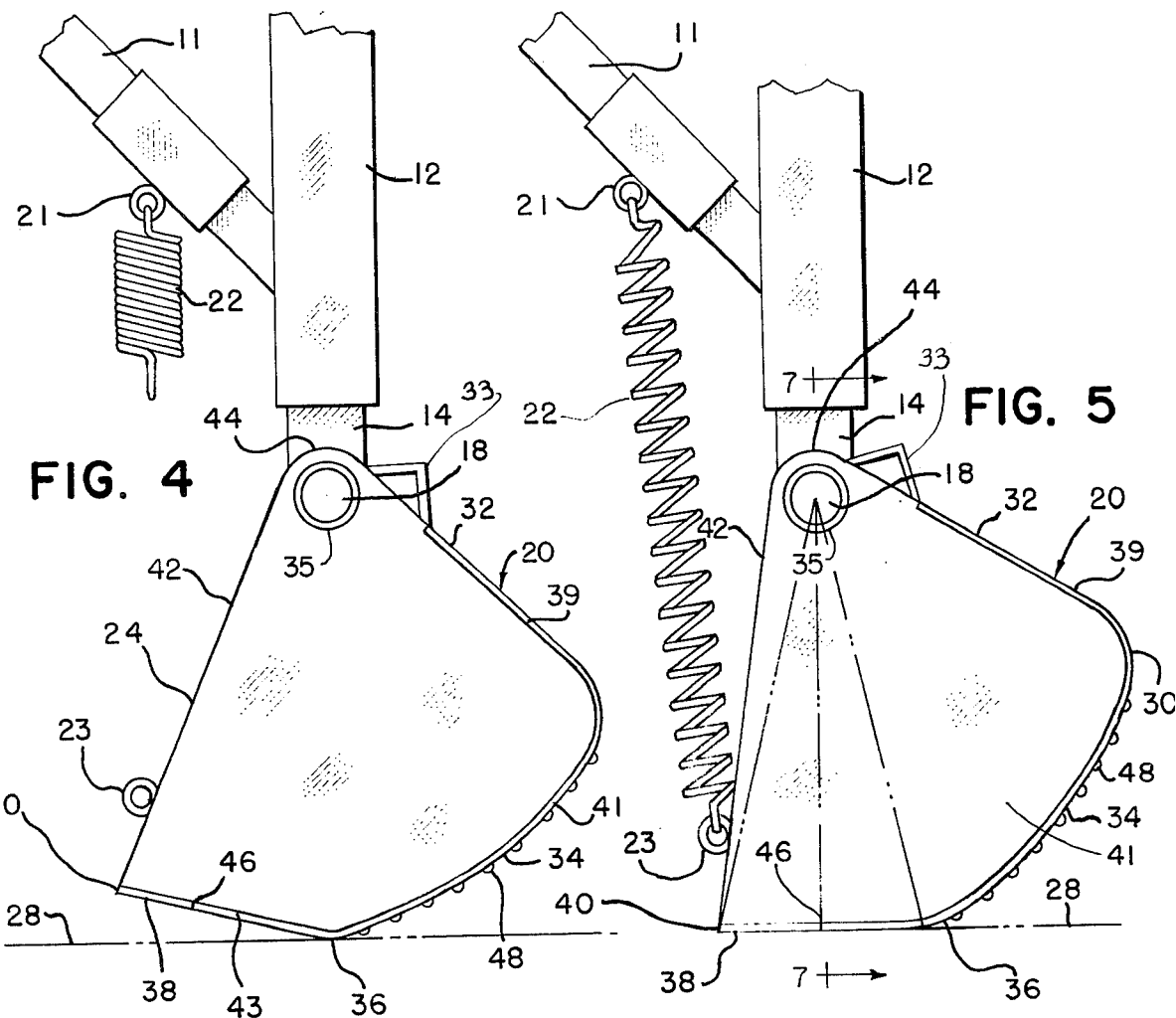
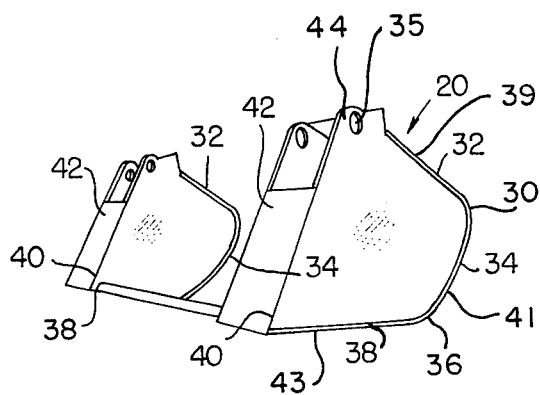
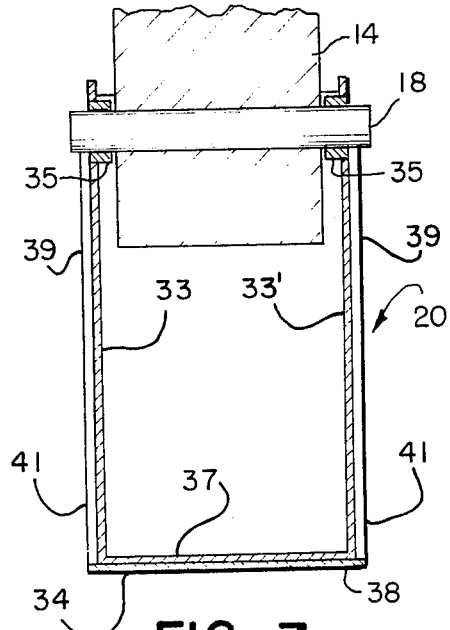

LANDING GEAR FOR SEMI-TRAILER

BACKGROUND OF THE INVENTION

This invention relates in general to the field of semi-trailer construction, and more particularly, is directed to a novel landing gear for semi-trailers.

In the art of designing and constructing semi-trailers, is is the usual practice to provide a landing construction in the form of a pair of wheels or a pair of pads which are designed to carry the load at the forward position of the semi-trailer when the semi-trailer is not associated with a tractor. The prior art landing constructions included a fixed strut which terminated downwardly in an axle upon which a landing pad or wheel was journaled. The strut was provided with jack means to permit raising and lowering of the wheel or pad by rotating the jack handle in well known manner. During normal periods of road operation, the forward end of the trailer was supported upon the tractor and the jack was turned sufficiently to elevate the pad or wheel above the road surface so as not to interfere with the normal road operation of the vehicle. When it was desired to park the semi-trailer and to remove the tractor, the jack was functioned to thereby lower the landing pad or wheel until the pad or wheel lifted the weight of the forward end of the semi-trailer above the tractor to thereby permit the tractor to be disconnected entirely.

The present method of operation is quite time consuming and requires a driver having sufficient strength to function the jack for landing pad or wheel lowering and raising purposes. Considering the weight of the semi-trailer itself when supported directly upon the landing pad or wheel, it will be appreciated that considerable strength and exertion is required at the jack handle to counterbalance the weight imposed.

SUMMARY OF THE INVENTION

The present invention relates in general to a landing gear for semi-trailers, and more particularly, is directed to improvements in supporting the front end of semi-trailers.

The landing gear of the present invention includes a generally pie shaped landing pad wherein the apex is provided with an axially aligned opening of suitable size to function with and be compatible with existing semi-trailer landing pad or wheel axles. The landing pad pivots about the axle from a raised position wherein the landing pad is supported entirely clear of the road surface to a lower position wherein a flat portion of the landing contacts the road surface to support the weight of the forward end of the semi-trailer. The landing gear comprises an arcuate road contacting portion which serves as a cam to raise the forward end of the semi-trailer when the semi-trailer is backed. The cam landing pad terminates rearwardly in a flat, support surface of sufficient length and strength to provide a stable support for the semi-trailer.

A spring biases between the trailing edge of the landing pad and affixed semi-trailer construction member to continuously urge the landing gear to rotate about the axle to the raised, road clearing position. When it is desired to employ the landing gear to support the weight of the front end of the semi-trailer, the spring is disconnected to thereby permit the cam landing pad to rotate by gravity about the axle to contact the road surface.

It is therefore an object of the present invention to provide an improved landing gear for semi-trailers of the type set forth.

It is another object of the present invention to provide a novel landing gear for semi-trailers which is compatible with existing semi-trailer constructions and which utilizes the present landing pad or wheel support construction.

It is another object of the present invention to provide a novel landing gear for semi-trailers which includes a pivotally connected landing gear which is generally spring biased to a raised, ground clearing position under all periods of normal road use.

It is a further object of the present invention to provide a novel landing gear for semi-trailers which is generally pie shaped in configuration and which is pivotally connected to the semi-trailer construction at its apex whereby it is movable from a position clear of the ground to a position in contact with the ground for semi-trailer support purposes.

It is another object of the present invention to provide a novel landing gear for semi-trailers including a generally pie shaped landing pad, the pad comprising a straight, forward, rise portion, an arcuate, cam landing pad rearwardly connected to the rise portion, the said cam landing pad terminating rearwardly in a flat, semi-trailer support pad of sufficient strength to carry the weight of the semi-trailer.

It is another object of the present invention to provide a novel landing gear for semi-trailers that is rugged in construction, inexpensive in manufacture and trouble free when in use.

Other objects and a fuller understanding of the invention will be had by referring to the following description and claims of a preferred embodiment thereof, taken in conjunction with the accompanying drawings, wherein like reference characters refer to similar parts throughout the several views and in which:

BRIEF DESCRIPTION OF THE DRAWINGS

FIG. 4 is a side elevational view similar to FIG. 3 showing the landing pad being rotated toward the semi-trailer support position.

FIG. 5 is a side elevational view view similar to FIG. 3 showing the landing pad in the full semi-trailer support position.

FIG. 6 is a perspective view of a pair of landing pads interconnected together.

FIG. 7 is a cross sectional view taken along Line 7—7 of FIG. 5, looking in the direction of the arrows.

DESCRIPTION OF THE PREFERRED EMBODIMENT OF THE INVENTION

Figure 1:
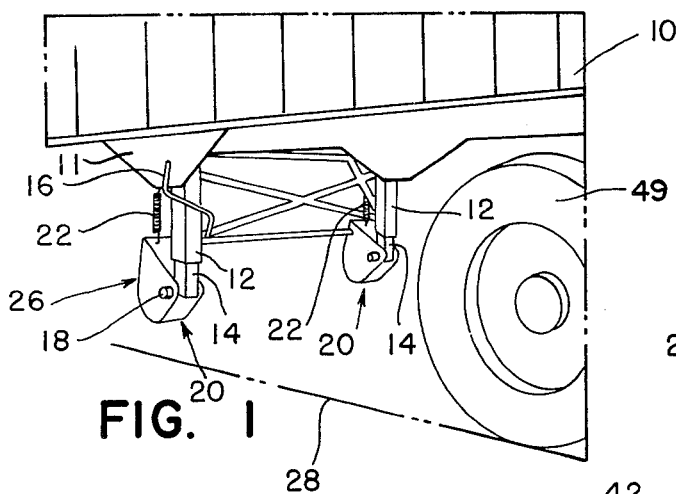
FIG. 1 is a perspective view showing the landing gear in use in raised position.

Although specific terms are used in the following description for the sake of clarity, these terms are intended to refer only to the particular structure of my invention selected for illustration in the drawings, and are not intended to define or limit the scope of the invention.

Referring now to the drawings, I show in FIG. 1 a conventional semi-trailer body 10 which employs the usual landing gear support construction 11 comprising a vertical support 12 and a jack 14 which is vertically slidable relative to the support 12 in well known manner upon rotary operation of the jack handle 16. The bottom of the jack 14 carries a horizontal axle 18 which in prior art applications, carried a landing wheel or landing pad (not shown). In accordance with the present invention, the generally pie shaped landing pad 20 pivotally mounts upon the existing, conventional axle 18 in a manner to permit pivotal rotary movement of the landing pad 20 about the axle 18. Accordingly, it will be seen that the present invention is completely compatible for use with existing semi-trailer landing gears with but minimum modification. The landing pad 20 is preferably fabricated of welded steel plate of suitable strength to a generally pie-shaped configuration having a transverse dimension of approximately eight inches to provide a solid, stable footing to support the weight of the semi-trailer 10. A spring 22 biases between a fixed portion of the semi-trailer landing gear construction 11 and the top surface 24 of the landing pad 20 in a manner to tend to pull the landing gear in a clockwise direction about the axle 18 to its upper position 26. (see FIG. 1) When in the upper position 26, there is approximately ten inches of clearance between the landing pad 20 and the road surface 28 to thereby permit the semi-trailer 10 to be freely movable over the road surface 28. Spring connection eyelets 21, 23 respectively conventionally affix to the landing gear support construction 11 and to the landing pad top surface 24 to facilitate easy connection.

In lieu of the spring 22, any other suitable type of retracting means may be employed such as hydraulic or electric retractors of known design and still fall within the scope of my invention. The landing pad face 32 includes a stop which serves as a safety feature by limiting the counter clockwise travel of the pad 20 about the axle 18. As best seen in FIG. 5, when the landing pad 20 is rotated to fully support the weight of the semi-trailer, the stop contacts the jack 14 to prevent further counter-clockwise rotative movement. It will be noted that when the landing pad is rotated to the support position of FIG. 5, the driver will lock the rear trailer wheels 49 from the cab by employing the usual trolley brake (not shown). The trolley brake operates independently of the present invention an remains locked after the tractor is removed.

Figure 2:
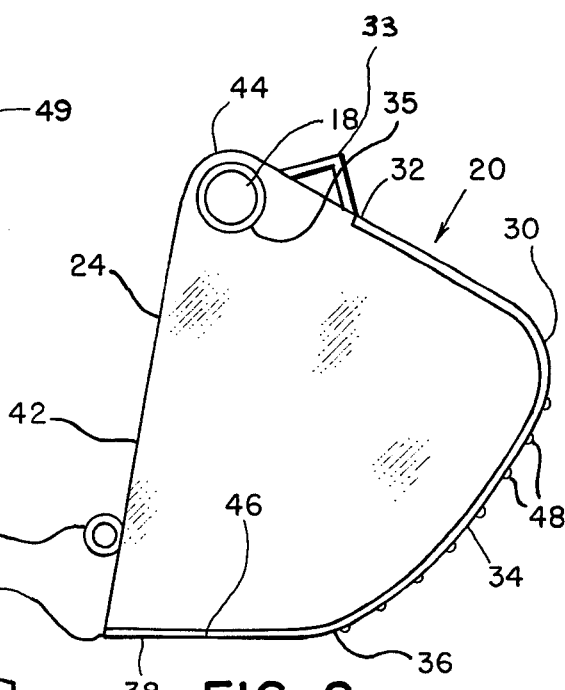
FIG. 2 is an enlarged side elevational view of a pie shaped landing pad constructed in accordance with the instant invention.
Figure 3:
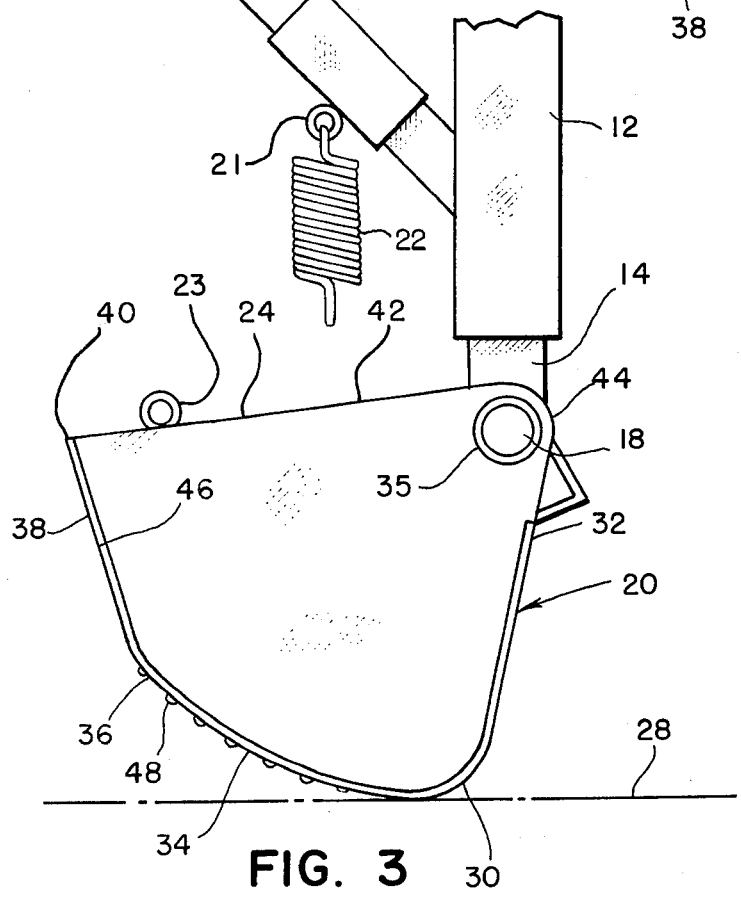
FIG. 3 is an enlarged, side elevational view of the landing gear of FIG. 1, showing the landing pad in ground contacting position.

When it is desired to employ the landing pad 20 to support the semi-trailer 10 by rotating the landing pad to the position illustrated in FIG. 2, the springs 22 are disconnected from the eyelets 23 of landing pad 20 to thereby permit the landing pad apparatus to rotate in a counter-clockwise direction about the axle 18 relative to the jack construction 14 until the nose 30 contacts the road surface 28. By fabricating the landing pad front face 32 9 inches in length, it will be found that the landing pad will rotate about the axle 18 and introduce the front of the curved cam surface 34 into contact wth the road surface 28. (See FIG. 3) At the point of initial contact, without weight being applied to the landing pad 20, the axle 18 will normally be positioned precisely 11 and ½ inches above the ground surface 28. The cam surface 34 arcuately curves in a path which is spaced from the center of the top landing pad pivot bearing 35 in a uniform curve from a 9 inch radius at the nose 30 through a medial distance of approximately a fifteen inch radius to a radius the the approximately a 15 ½ inch at the trailing edge 36 of the curved cam surface 34. A from the support pad 38 extends rearwardly from the trailing edge 36 and terminates rearwardly in an acute angular connection 40 with the rear face 42 of the landing pad 20. The front face 32 and the rear face 42 angularly upwardly incline to intersect at an acute angle to form an apex 44 within which is carried the bearing 35 which is associated with the axle 18 in pivotal arrangement. The angular connection 40 positions at a radial distance of 15½ inches from the center of the bearing 35. Preferably, the straight line radial distance from the mid-point 46 of the flat support pad 38 to the center of the bearing 35 is 14½ inches. The geometry of the system is such that when the support pad 38 is in contact with the road surface 28 as in FIG. 5, the mid-point 46 vertically aligns under the axle 18 to thereby carry the weight of the semi-trailer in a stable manner. Lines drawn from the trailing edge 36 and the acute angle 40 to the center of the axle 18 will from isosceles triangles for optimum support as shown in phantom lines in FIG. 5.

In order to use the present invention, the usual flat landing pad or wheel (not shown) of a semi-trailer 10 are removed from association with the axle 18 and the landing pad 20 of the present invention is installed in lieu thereof. The existing wheel axle 18 is utilized with the landing pad 20 by pivotally attaching the landing pad to the jack construction by inserting the axle 18 through the landing pad bearing 35 for conventional pivotal relative movement. The springs 22 bias between the eyelet 23 of the rear face 42 of the landing pad and the eyelet 21 on the fixed construction 11 on the semi-trailer 10 to normally pivot the landing pad 20 about the axle 18 in a clockwise manner to its upper position 26. With the landing pad 20 in the upper position 26 as in FIG. 1, there is sufficient clearance between the landing pad and the road surface 28 to permit the semi-trailer 10 to be readily moved to any desired location without any danger or possibility of landing pad 20 contacting the road surface 28.

As best seen in FIG. 1, I preferably fabricate the landing pad 20 of sturdy plate steel of sufficient strength to support the weight of the semi-trailer without deformation or other permanent danger. Plate steel sides 33, 35 are welded or otherwise permanently affixed to the bottom support 37 to carry the curved cam surface 34. The front face 32 is similarly welded to the sides 33,33, as is the rear face 42 to form an exceedingly strong support construction. If desired for ease in fabrication, the front face 32 curved cam surface 34 and the flat support pad 38 can be provided with respective outwardly projecting flanges 39,41,43 to facilitate the welding procedures.

When it is desired to employ the landing pad 20 to support the weight of the semi-trailer 10, the springs 22 are disconnected from the rear face eyelet 23 to thereby permit the landing pad 20 to swing by gravity about the bearing 35 in a counter-clockwise direction until the nose 30 of the cam surface 34 contacts the road surface 28. (See FIG. 3) In this position, the axle 18 will normally be positioned approximately eleven and one-half inches above the road surface 28. The semi-trailer is then backed directly backwards by conventionally employing a tractor (not shown) causing the roughened surface 48 which may be conventional ¼ inch diamond steel plate, of the curved cam surface 34 to frictionally engage the road 28 thereby causing the landing pad 20 to rotate relative to the jack 14 about the axle 18 in a counter-clockwise direction. When the semi-trailer has been backed approximately 10 inches, the configuration of the cam surface 34 is such that this will raise the axle 18 to a position approximately 15 and ½ inches above the road surface 28. When the trailer has been backed twelve inches, the flat support pad 38 will approach contact with the road surface 28 and the axle 18 will be held approximately fifteen inches above the road surface 28. See FIG. 4.

When the semi-trailer has been backed thirteen inches, the flat support pad 38 will position flatly upon the road surface 28 to fully support the entire weight of the semi-trailer in a stable manner. See FIG. 5. In this position, the axle 18 will be securely held fourteen and one-half inches above the road surface. Accordingly, the axle 18 will be raised and held a full 3 inches from the unsupported position of FIG. 1 to the fully supported position of FIG. 5, thereby allowing the tractor (not shown) to be uncoupled by pulling the usual fifth wheel locking handle (not shown) and by disconnecting the conventional air hoses (also not shown). Thus, the semi-trailer 10 can be fully supported by the landing pad 20 in a manner to permit uncoupling of the tractor without any need to raise or lower the jack 14 such as by utilizing the jack handle 16.

When it is desired to again move the semi-trailer 10 to another location, the tractor (not shown) is coupled to the semi-trailer and the fifth wheel is conventionally automatically locked. The driver recouples the air hoses and electrical lines (not shown). With the landing pad 20 in the position of FIG. 5, the driver reconnects the spring 22 to the rear face spring eyelet 23. The driver then conventionally releases the trolley brake (not shown) in the cab of the tractor and moves the tractor slowly forward to pull the semi-trailer 10 forwardly. The frictional engagement of the flat support pad 38 and the road surface 28 causes the landing gear 20 to rotate in a clockwise direction relative to the axle 18. Continued forward movement of the semi-trailer 10 causes the curved cam surface 34 to roll over the ground surface until the nose 30 clears the ground surface. The spring 22 then acts to pull the landing pad 20 to the fully rotated clockwise upper position 26 as in FIG. 1. Thus, a semi-trailer 10 can be readily coupled and uncoupled from a tractor without the need for raising or lowering the front end of the semi-trailer by employing the usual jacks.

Although I have described the present invention with reference to particular embodiments herein set forth, it is understood that the present disclosure has been made only by way of example and that numerous changes in the details of construction may be resorted to without departing from the spirit and scope of the invention. Thus, the scope of the invention should not be limited by the foregoing specification, but rather only by the scope of the claims appended hereto.

I claim:

1. In a landing gear construction for supporting the forward end of semi-trailers above the ground surface, wherein the semi-trailer construction carries an axle at an initial height, the combination of A. a landing pad rotatively connected to the axle and having clockwise and counter-clockwise movement about the axle,
  1. said landing pad including a front face, a rear face and a curved cam surface extending from the front face,
  2. said landing pad further including a flat support pad in spaced relation from the axle, said flat support pad being interconnected between the rear face and the curved cam surface;
B. spring means biasing between a portion of the semi-trailer construction and a portion of the landing pad,
  1. said spring means biasing the landing pad about the axle to an upper position wherein the landing pad is carried above the said ground surface and the flat support pad is positioned in angular relation to the ground surface; and
C. means to vary the height of the axle relative to the semi-trailer construction.

2. The invention of claim 1 wherein the spring means comprise a coil spring having two ends, one end being connected to the semi-trailer construction and the other end being connected to the landing pad.

3. The landing gear construction of claim 2 wherein the other said end of the coil spring is provided with disconnect means to easily disconnect the spring from the connecting member.

4. The invention of claim 3 wherein the disconnect means include an eyelet affixed to the landing pad, the said spring end being easily engaged in and disengaged from eyelet.

5. The landing gear construction of claim 3 wherein the curve of the curved cam surface is defined by radii between the curved cam surface and the axle which increase in length from the point of connection to the front face to the connection to the flat support pad.

6. In a method of supporting the front end of a semi-trailer construction which is equipped with a landing gear axle and a jack to raise and lower the axle, the steps of A. connecting a motor vehicle to the semi-trailer to support the front end of the semi-trailer;
B. affixing a landing pad having a cam surface and a flat support surface to the axle;
C. lowering the jack until the cam surface contacts the ground;
D. moving the semi-trailer in the direction of the flat support surface until the flat surface rests upon the groun to support the weight of the semi-trailer;
E. removing the motor vehicle from association with the semi-trailer.

7. The method of claim 6 and the additional steps of again connecting a motor vehicle to the semi-trailer, connecting a spring between the landing pad and the semi-trailer construction in biased condition, and moving the semi-trailer in the direction of the cam surface.

8. The method of claim 7 and the additional step of utilizing the spring bias to rotate the landing pad relative to the axle to a raised position.

9. The method of claim 8 and the additional step of raising the axle by employing the jack after the landing pad has been rotated to the raised position.

* * * * *